(12) United States Patent
McLean (10) Patent No.: US 10,148,674 B2
(45) Date of Patent: Dec. 4, 2018

(54) METHOD FOR SEMI-SUPERVISED LEARNING APPROACH TO ADD CONTEXT TO MALICIOUS EVENTS

(71) Applicant: SECUREWORKS HOLDING CORPORATION, Atlanta, GA (US)

(72) Inventor: Lewis I. McLean, Scotland (GB)

(73) Assignee: Dell Products, LP, Round Rock, TX (US)

( * ) Notice: Subject to any disclaimer, the term of this patent is extended or adjusted under 35 U.S.C. 154(b) by 125 days.

(21) Appl. No.: 14/966,595

(22) Filed: Dec. 11, 2015

(65) Prior Publication Data
US 2017/0171228 A1     Jun. 15, 2017

(51) Int. Cl.
*H04L 9/00*     (2006.01)
*H04L 29/06*    (2006.01)

(52) U.S. Cl.
CPC ............... *H04L 63/1416* (2013.01)

(58) Field of Classification Search
CPC .................................................. H04L 63/1416
See application file for complete search history.

(56) References Cited

U.S. PATENT DOCUMENTS

| 7,716,739 | B1 | 5/2010 | McCorkendale | |
|---|---|---|---|---|
| 2007/0300300 | A1 | 12/2007 | Guo et al. | |
| 2017/0063906 | A1* | 3/2017 | Muddu | H04L 63/1425 |

OTHER PUBLICATIONS

Hutchins, "Intelligence-Driven Computer Network Defense Informed by Analysis of Adversary Campaigns and Intrusion Kill Chains," Lockheed Martin Corporation, Nov. 21, 2010; 14 pgs.; http://www.lockheedmartin.com/content/dam/lockheed/data/corporate/documents/LM-White-Paper-Intel-Driven-Defense.pdf.
"Fido Documentation," Netflix Fido blog, paged edited Nov. 3, 2014 by robfry, 2 pgs.; https://github.com/Neftlix/Fido/wiki.
"Introducing FIDO: Automated Security Incident Response," The Netflix Techblog, May 4, 2015; 2 pgs.; http://techblog.netflix.com/2015/05/introducing-fido-automated-security.html.

* cited by examiner

*Primary Examiner* — Alexander Lagor
*Assistant Examiner* — Syed M Ahsan
(74) *Attorney, Agent, or Firm* — Larson Newman, LLP (57) ABSTRACT

An information handling system includes an input and a processor. The processor receives a sequence of events, detects a first event within the sequence of events, determines a first state of a Markov model associated with the first event, detects a second event within the sequence of events, determines a second state of the Markov model associated with the second event, detects a state transition from the first state to the second state in the Markov model, determines a partial match of the sequence of events to a kill sequence of events in response to the state transition from the first state to the second state in the Markov model, and logs all events that occurred in the information handling system in between the first event and the second event.

17 Claims, 6 Drawing Sheets

METHOD FOR SEMI-SUPERVISED LEARNING APPROACH TO ADD CONTEXT TO MALICIOUS EVENTS

FIELD OF THE DISCLOSURE

The present disclosure generally relates to information handling systems, and more particularly relates to adding context to security information and event monitoring events using semi-supervised learning.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. Information handling systems may process events, such as communications over a network and online customer purchases.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

An information handling system, such as a sequence analyzer, within a network can receive information from a client with respect to a kill chain/sequence detected on the client. In an embodiment, a kill sequence is a sequence of events or actions performed in a client that result in a malicious activity taking place in the client. The information handling system can then learn, retain, and apply the information from the client having malicious activity to all clients within the network.

The information handling system can learn, retain, and apply the information related to a kill sequence via both a batch or inline learning process. The information handling system can also enumerate a set of kill sequences from multiple network or clients networks, and can apply the enumerated set of kill sequences to all of the clients within the network. The information handling system can further utilize one or more kill sequences to create Markov models that can be applied to detect whether new malicious activities are being performed. The Markov models can be used to create a rapid incident response when a partial sequence match is coupled with a log storage system to research unknown attack vectors.

Figure 1:
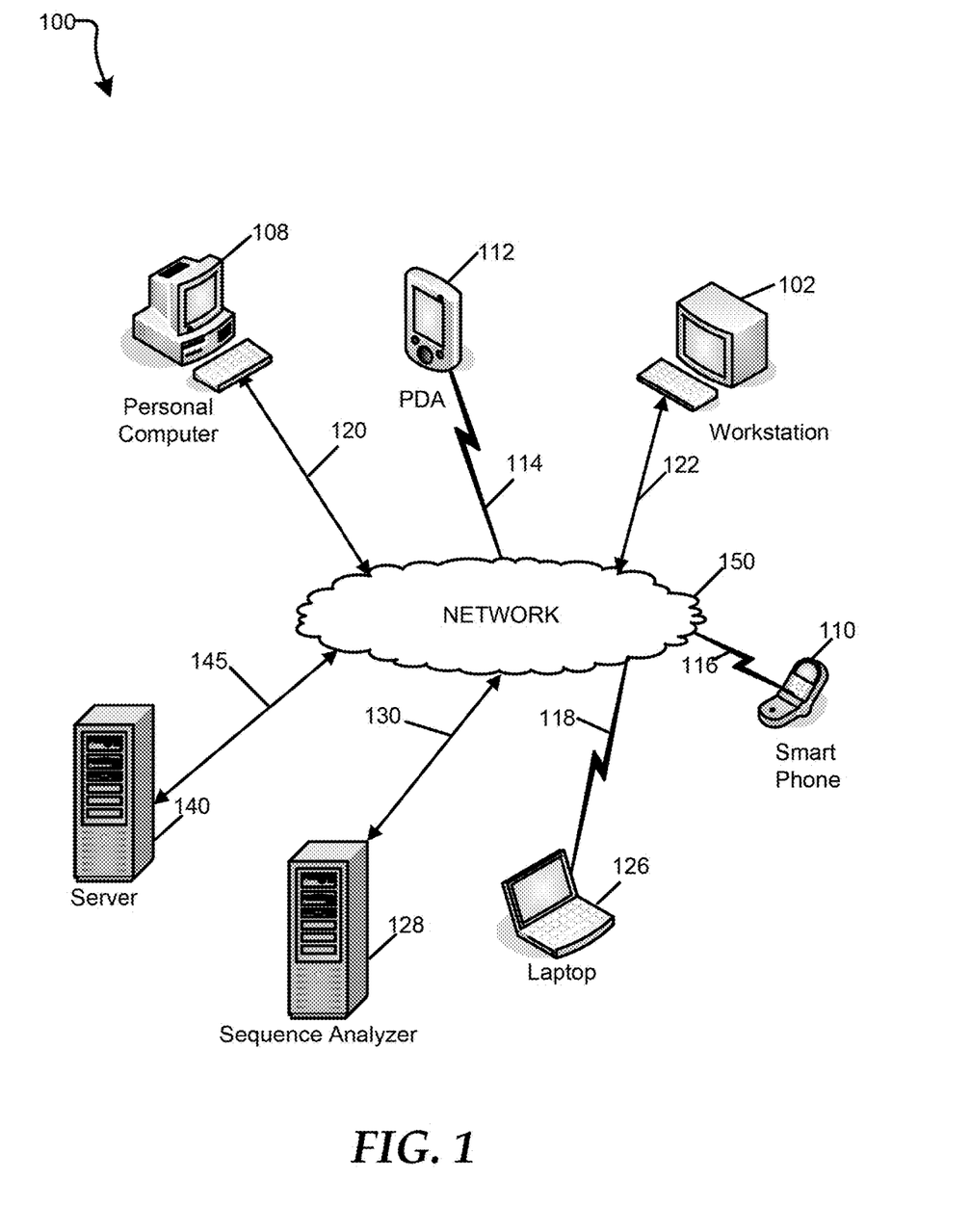
FIG. 1 is a block diagram of a networked system of information handling systems according to an embodiment of the present disclosure.

FIG. 1 is a block diagram of a networked system 100 of information handling systems. The system 100 includes a network 150, sequence analyzer 128 connected to network 150 through wireline connection 130, and a variety of information handling systems capable of communicating over network 150 with sequence analyzer 128 including a workstation 102, a personal computer 108, a smart cellular telephone 110, a personal digital assistant 112, a laptop computer 126, and a server 140. The workstation 102 can be a computer, and is coupled to network 150 through wireline connection 122. The personal computer 108 is coupled to network 150 through wireline connection 120. The smart cellular telephone 110 is coupled to network 150 through wireless connection 116. The personal digital assistant 112 is coupled to network 150 through wireless connection 114. The personal digital assistant 112 is coupled to network 150 through wireless connection 114. The laptop computer 126 is coupled to network 150 through wireless connection 118. The server 140 is connected to network 150 through wireline connection 130.

In an embodiment the network 150, which may consist of the Internet or another wide area network, a local area network, or a combination of networks, may provide data communications among the sequence analyzer 128 and the information handling systems 102, 108, 112, 126, 110, and 140. The sequence analyzer 128 may analyze sequences of events occurring over network 150 or at one of the information handling systems connected to network 150. In an embodiment, an event may be an occurrence at a system being monitored. In some embodiments, sequence analyzer 128 may determine whether the sequences of events are normal sequences of events or whether the sequences of events include a kill chain or sequence. In an embodiment, a kill chain can be a sequence of events that result in a malicious event within the network 150.

A sequence of events may be determined to be a kill sequence based upon observation or calculation. In an embodiment, events may be monitored during a training period and formed into sequences. However, in some situations only a few of the events within a kill sequence may be detected and these events may be distinct events from different systems within the network 150. In an embodiment, an enumeration of all possible kill sequences may be performed by the sequence analyzer 128 to link the different events of a kill sequence back together.

The network 150 may include a security information and event monitoring (STEM) system, such as sequence analyzer 150, to monitor the different systems within the network 150. If an event matches a rule set, the sequence analyzer 150 may place the event within a queue for further investigation, such as by an analyst. However, multiple analysts may be utilized to investigate events such that one analyst may investigate one event in a kill sequence and another analyst may investigate a different event in the kill sequence without knowledge of the other event. In this situation, the single events alone may not trigger the manual identification of a kill sequence without being linked to the other event.

Figure 2:
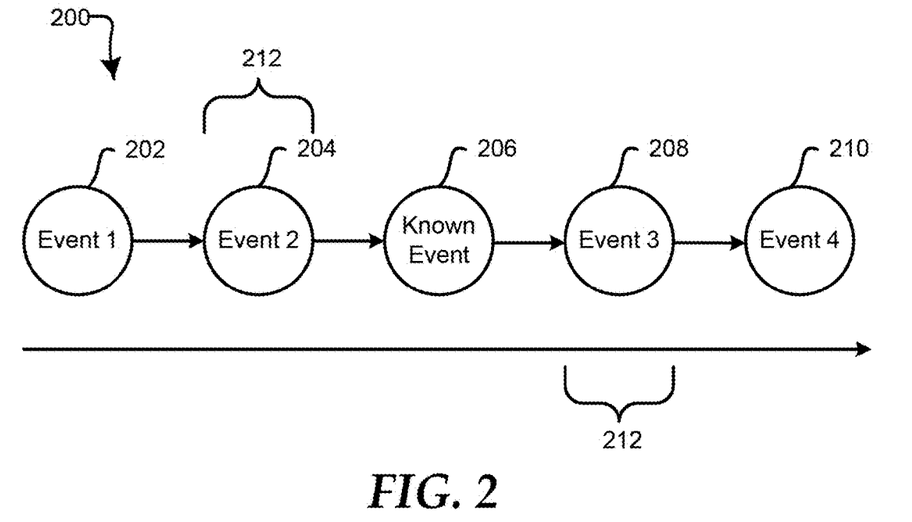
FIG. 2 is a timeline of sequences of events according to an embodiment of the present disclosure.

FIG. 2 illustrates a timeline 200 of a sequence of events according to at least one embodiment of the present disclosure. Timeline 200 includes events 202, 204, 206, 208, and 210. In FIG. 2, the sequence Event 202→Event 204→Known Event 206→Event 208→Event 210 may represent a kill sequence of events, which may present a security risk to a network such as network 150 of FIG. 1.

In an embodiment, the known or reference event 206 can be a malicious event, such as a WGET command to a suspicious URL with an EXEC command. For example, the WGET command and EXEC command can cause a system within the network 150 to retrieve content from a malicious web server or other information handling system. In an embodiment, the events 202 and 204 can be events that occur in the kill sequence before a reference event 206, and the events 208 and 210 can be events that occur in the kill sequence after the reference event. In an embodiment, event 202 can be an SQL injection attempt, such as an attempt to insert malicious SQL statements into an entry field for execution by a device or information handling system within the network 150. Event 204 can be a buffer overflow event. Event 208 can be a command and control server call home execution, and event 210 can be an Internet Control Message Protocol (ICMP) traffic event.

In an embodiment, the kill sequence of events illustrated by timing diagram 200 can originate in any device, such as the personal computer 108, the server 140, or represent a user's account behavior or the like, within the network 150, and can be provided to the sequence analyzer 128. The sequence analyzer 128 can receive the kill sequence of events either directly from the originating device or from a central database store. The sequence analyzer 128 can then perform a learning process on the kill sequence of events. In an embodiment, the sequence analyzer 128 can perform the learning process on multiple kill sequence of events from multiple devices within the network 150. In an embodiment, the learning process can be performed continuously, at regular intervals, such as inline, once a day, once a week, once a month, or the like.

During the learning process, the sequence analyzer 128 can search each kill sequence of events received since the last batch learning process for true positive events, such as reference event 206. The reference event 206 can be a known malicious event, can be manually classified by a human, or the like. The sequence analyzer 128 can utilize the events 202, 204, 208, and 210 along with the reference event 206 to create an interval based Markov model that represents observable event transitions. In an embodiment, multiple devices in the network 150 can provide multiple kill sequences of events each with equal reference event types. In this situation, the Markov models from each of the kill sequences of events can be combined to strengthen the learned associations between the transitions during the learning process.

An interval based Markov model may allow for noise interleaving in the learnable sequential kill sequence and through combination the noise is obscured as the associations are strengthened. In an embodiment, an interval, such as interval 212 in FIG. 2, used for training can determined by human experts based upon heuristic knowledge of a section of the kill chain. The sequence analyzer 128 can utilize the reference event 206 and other event 202, 204, 208, and 210 to statistically infer associations between events without prior knowledge. The sequence analyzer 128 can create a Markov model, such as Markov model 300 in FIG. 3.

Figure 3:
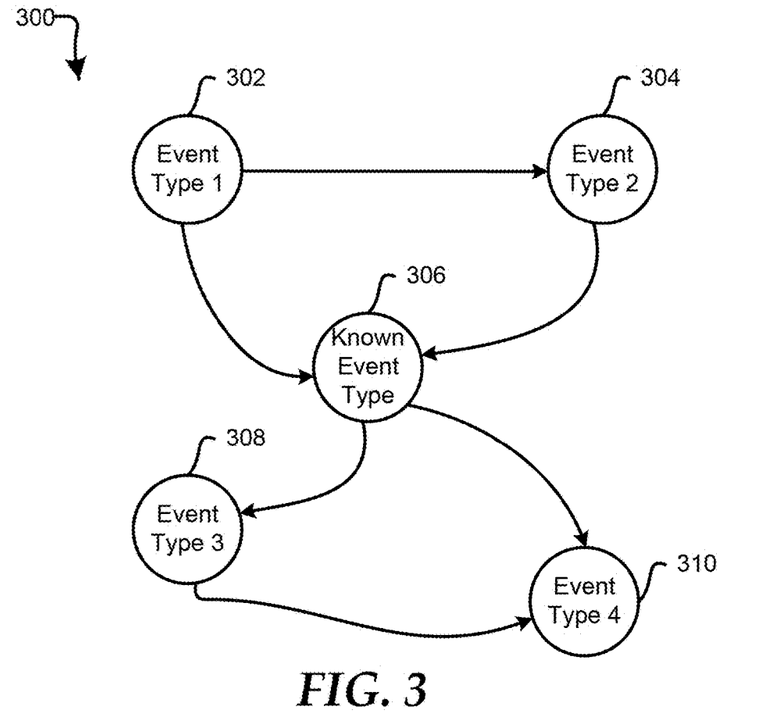
FIG. 3 illustrates a Markov model with transitional probabilities removed of linked events according to at least one embodiment of the present disclosure.

FIG. 3 illustrates a Markov model of linked event types according to at least one embodiment of the present disclosure. In an embodiment, an event type can be created by grouping multiple events with similar characteristics together as a single event type. The sequence analyzer 128 can utilize the Markov model 300 to perform an inline process to link detected event types and determine whether the linked event type indicates a kill sequence of events. In an embodiment, event type linking can occur at a stage in a pipeline before event prioritization. In this situation, event types may be processed out of time order. The Markov model 300 can be utilized to process the event types even if the processing occurs out of order. In an embodiment, the Markov model 300 can be used in the sequence analyzer 128 in a similar manner as a state machine. For example, the arrival of a new matching event type that results in a traversal from a current or last matching event type can cause the state of the Markov model 300 to advance. In an embodiment, the Markov model 300 can include different states associated with different event types. For example, a state 302 can be associated with an event type 1, a state 304 can be associated with an event type 2, a state 306 can be associated with a known or reference event type, a state 308 can be associated with an event type 3, and a state 310 can be associated with an event type 4. In an embodiment, the transition arrow between states of the Markov model 300 can be defined as heuristic intervals, as determined by the human experts. In an embodiment, a heuristic interval is a defined length of time that can elapse between two events before the two event are no longer tied together. When complexity is introduced and there may be cause for multiple paths within the model, the application of the models conditional probabilities are utilized for the chosen traversal.

In an embodiment, the occurrence of an advancement in the Markov model 300 can cause the events to be enriched with different levels of information, such as previous observed events that may complete a successful sequence, the probability of all events prior to the observed event being part of the kill sequence, the possible enumerated kill sequence that the event could belong, or the like. The Markov models, such as Markov model 300, can be advanced per customer asset or identifiable entity, such as a workstation 102, a single server 140, user account or the like.

Sequence learning in the sequence analyzer 128 can be an ongoing process where the Markov models, such as Markov model 300, can be updated with new data and new event types that map to a section of the kill sequence as they are discovered. The level of data in the Markov models can be abstract enough that Markov models learned from data specific to one client in the network 150 can be applied to other clients due to the anatomy of the kill sequence. The sequence analyzer 128 can perform a semantic mapping of specific events to event type. In an embodiment, this mapping can be handled through security information and event monitoring (STEM) filters, Intrusion Detection System (IDS) signatures, Expert System rule sets, or the like and can be structured like an n-nary tree into a taxonomy covering a threat classification.

In an embodiment, when the sequence analyzer 128 performs an inline process on an event, determines that a partial match to a kill sequence is detected, and determines that a traversal between a missing event type is of a high probability, the sequence analyzer 128 can push the event to a further enrichment stage. As stated above, the sequence analyzer 128 can use the heuristic intervals, as determined by the human experts, during the enrichment of the event. In an embodiment, the intervals can be used to collect the suitable logs from the single server, or from systems that may have been logging information about the identifiable entity, such as a firewall, domain controller or the like. The sequence analyzer 128 can then treat the other events that make up the sequence along with logs covering the interval where there is a missing event as the context for a human expert to diagnose and classify the event. This allows for research into unknown attack vectors and rapid incident response through partial sequence matching.

In an embodiment, the sequence analyzer 128 can receive the following exemplary sequence of event types Event Type 1→Event Type 2→Known Event Type→Event Type 4. The sequence analyzer 128 can utilize the Markov model 300 during an inline processing of events, which can determine whether a kill sequence has been detected. In this embodiment, the event type 1 is associated with state 302, such that the Markov model is at state 302 in response to the sequence analyzer 128 detecting an event of event type 1. The sequence analyzer 128 can determine that no sequence can be identified from only one event type and no transition between states of the Marko model 300. However, the sequence analyzer 128 can determine to enrich the event to get more information about the event. The sequence analyzer 128 can then receive an event of event type 2, which can cause the Markov model 300 to transition from state 302 to state 304. The sequence analyzer 128 may still not be able to identify the sequence of events, but can enrich the event of event type 2 to get the information associated with the event and contextually link event type 2 to event type 1.

The sequence analyzer 128 can then detect an event of a known or reference event type, which can cause a transition in the Markov model 300 from the state 304 to state 306. As a result of this transition, the sequence analyzer 128 can at least partially identify the sequence. The sequence analyzer 128 can then determine whether another event, such as event type 3 or 4, is detected within the heuristic interval. If an event of event type 3 or 4 is detected within the heuristic interval, the events can be logged in a central database of the network 150, and the sequence analyzer can enrich the most recently received event. The sequence analyzer 128 can then receive an event of event type 4, which can cause the Markov model 300 to transition from state 306 to state 310. The sequence analyzer 128 may then be able to identify the sequence of events, such as a kill sequence. The sequence analyzer 128 can then fully enrich the event type 4 to get the information associated with event type 4. Thus, the sequence of events Event Type 1→Event Type 2→Known Event Type→Event Type 4, can cause state transitions in the Markov model 300 of state 302→state 304→state 306→state 310. In response to the sequence analyzer 128 detecting these state transitions, the sequence analyzer can positively identify the sequence as a kill sequence.

In an embodiment, the sequence analyzer 128 can include and continually update probabilities associated with transitions in the Markov model 300. For example, the sequence analyzer 128 could have previously detected a sequence of events that include one transition from event type 1 to event type 2, and one transition from event type 1 to a known or reference event type. In this situation, the sequence analyzer 128 can include, in the Markov model 300, a 0.5 probability that the next event after an event of event type 1 in a sequence of events will be an event of event type 2, and a 0.5 probability that the next event will be an event of a known or reference event type. The sequence analyzer 128 can then receive a new sequence of events that includes an event of event type 1 followed by an event of event type 2. After analyzing this sequence of events, the sequence analyzer 128 can update the probabilities in the Markov model 300 to include a 0.66 probability of a transition from event type 1 to event type 2, and a 0.33 probability of a transition from event type 1 to a know or reference event type.

The sequence analyzer 128 can then receive the following exemplary sequence of events Event Type 1→Event Type 2→Event Type 3. The sequence analyzer 128 can utilize the Markov model 300 during an inline processing of events, which can determine whether a kill sequence has been detected. In this embodiment, the event type 1 is associated with state 302, such that the Markov model is at state 302 in response to the sequence analyzer 128 detecting an event of event type 1. The sequence analyzer 128 can determine that no sequence can be identified from only one event type and no transition between states of the Marko model 300 has been made. However, the sequence analyzer 128 can determine to enrich the event to get more information about the event. The sequence analyzer 128 can then receive an event of event type 2, which can cause the Markov model 300 to transition from state 302 to state 304. The sequence analyzer 128 may still not be able to identify the sequence of events, but can enrich the event to get the information associated with the event of event type 2.

The sequence analyzer 128 can then detect an event of event type 3, which can cause a transition in the Markov model 300 from the state 304 to state 308. As a result of this transition, the sequence analyzer 128 can at least partially identify the sequence. In particular, the sequence analyzer 128 can determine that a possible malicious sequence of events is taken place with one or more devices within the network 150 based on the events transitioning from events that occur before a known or reference event to an event that occurs after the reference event. However, the sequence analyzer 128 cannot positively identify a known event in the sequence. The sequence analyzer 128 can then determine if the event of event type 3 was detected within the heuristic interval as defined above. If so, then an assumption can be made that then an unknown event must have taken place, such as an industry termed 0-day, for which there is no known signature at the time of monitoring. The partial match is pushed to a further enrichment stage and where the event times are used as a bound to query for logs on a device or a central store pertaining to the identifiable entity, allowing research and investigation by a human analyst into a potential new attack vector and the ability to derive a new signature from specific logs.

For example, the logs of the systems between the events times of detection of the event of event type 2 and the detected of the event of type 3 can include all recorded events within this defined time period. The human analyst can then research these recorded or logged events to determine whether one of the logged events is a malicious attack. If the human analyst determines that one of the logged events is a malicious event, the human analyst can update the known or reference event type to include the signature of the newly discovered attack. Thus, the sequence of events Event Type 1→Event Type 2→Event Type 3, can cause state transitions in the Markov model 300 of state 302→state 304→state 308. In response to the sequence analyzer 128 detecting these state transitions, the sequence analyzer can identify the sequence may possibly be a kill sequence and that a human analyst should further investigate the sequence of events.

The sequence analyzer 128 can then receive the following exemplary sequence of events Event Type 1→N/A→Event Type 1→Event Type 2→Event Type 1→N/A→N/A. The sequence analyzer 128 can utilize the Markov model 300 during an inline processing of events, which can determine whether a kill sequence has been detected. In this embodiment, the event type 1 is associated with state 302, such that the Markov model is at state 302 in response to the sequence analyzer 128 detecting event type 1. The sequence analyzer 128 can determine that no sequence can be identified from only one event type and no transition between states of the Markov model 300 has been made. Within a specific period of time, such as the heuristic interval, no new event may be detected. In this situation, the state of the Markov model 300 remains at state 302. The sequence analyzer 128 can determine that no sequence can be identified and that no action is needed.

The sequence analyzer 128 can then detect an event within event type 1 associated with state 302, such that the Markov model 300 continues to remain at state 302. The sequence analyzer 128 can determine that no sequence can be identified and no transition between states of the Markov model 300 has been made. However, the sequence analyzer 128 can determine to enrich the event to get more information about the event. The sequence analyzer 128 can then receive an event of event type 2, which can cause the Markov model 300 to transition from state 302 to state 304. The sequence analyzer 128 may still not be able to identify the sequence of events, but can enrich the event to get the information associated with event.

The sequence analyzer 128 can then detect an event of event type 1, but the Markov model 300 continues to remain at state 304. The sequence analyzer 128 can determine that no sequence can be identified and no transition between states of the Marko model 300 has been made. However, the sequence analyzer 128 can determine to enrich the event to get more information about the event. Within the heuristic interval no new event may be detected. In this situation, the state of the Markov model 300 remains at state 304. The sequence analyzer 128 can determine that no sequence can be identified and that no action is needed. If another heuristic interval expires and no new event is detected, the sequence analyzer can clear the state of the Markov model 300. The sequence analyzer 128 can determine that no sequence can be identified and that no action is needed. Thus, the sequence of events Event Type 1→N/A→Event Type 1→Event Type 2→Event Type 1→N/A→N/A, can cause state transitions in the Markov model 300 of state 302→state 302→state 302→state 304→state 304→state 304→N/A. In response to the sequence analyzer 128 detecting these state transitions, the sequence analyzer can determine that the sequence of events requires escalation to a human analyst.

The arrangement of sequence analyzer 128 and other devices making up the exemplary system illustrated in FIG. 1 is for explanation, not for limitation. Data processing systems useful according to various embodiments of the present invention may omit a server, or may include additional servers, routers, note books, net books, tablets, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 4:
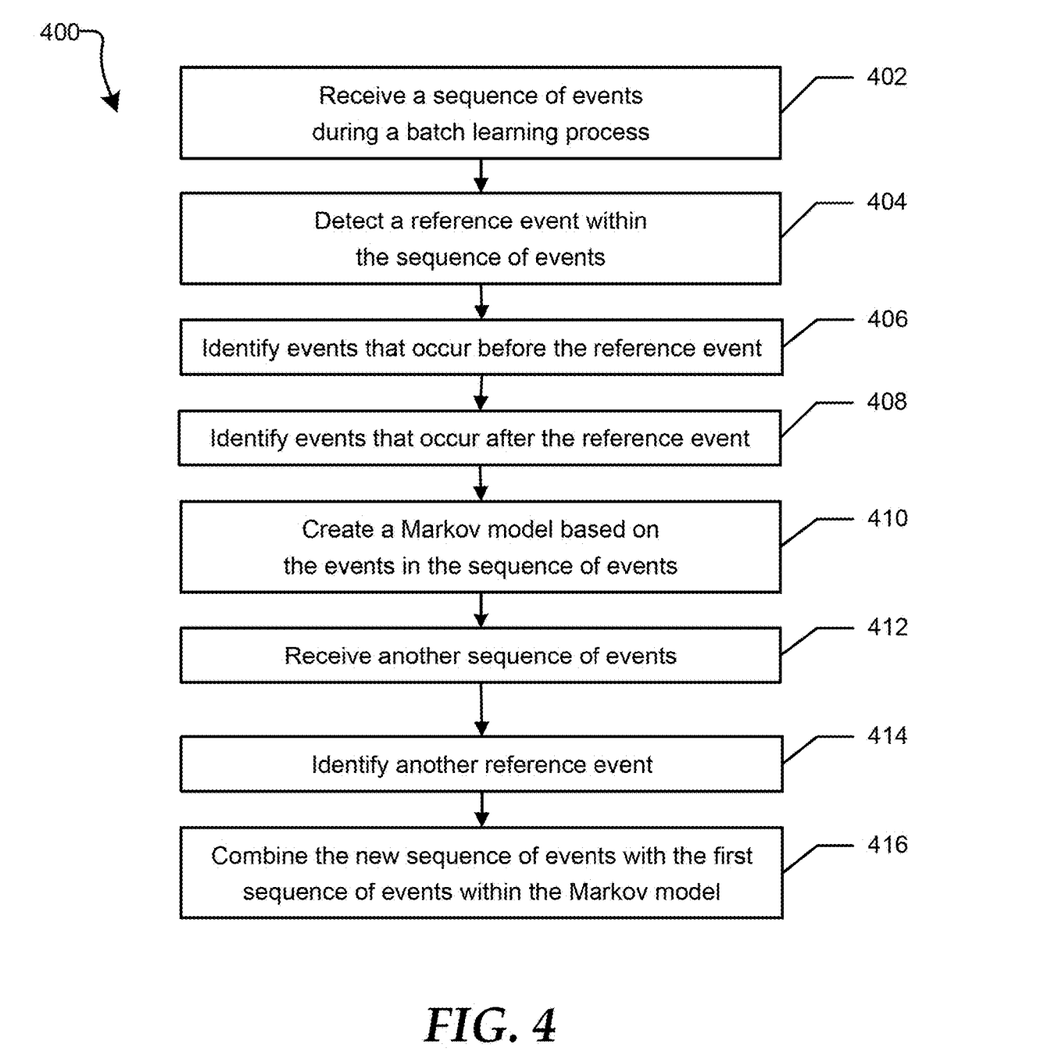
FIG. 4 is a flow diagram illustrating a method for performing a learning process on a sequence of events according to an embodiment of the present disclosure.

FIG. 4 is a flow diagram illustrating a method for performing a learning process on a sequence of events according to an embodiment of the present disclosure. At block 402, a sequence of events is received at a sequence analyzer during a learning process. In an embodiment, the sequence of events can be received from any of a number of information handling systems within a network. A reference event can be detected within the sequence of events at block 404. In an embodiment, the reference event can be any known malicious event, such as a known contact with a command and control server (C2/C2C), an event previously classified by an individual, a visible state on a kill sequence, or an Expert System such as an IDS, or the like.

At block 406, individual events that occur before the reference event are identified. Individual events that occur after the reference event are identified at block 408. At block 410, a Markov model that represents observable event transitions based on each of the events in the sequence of events is created. In an embodiment, the Markov model is interval based, and the interval is determined by human experts based on heuristic knowledge of a section of a kill sequence. Another sequence of events is received during the learning process at block 412. Another reference event type is identified in the next sequence of events at block 414. In an embodiment, another reference event type can be equal to the first reference event. At block 416, the newly received sequence of events is analyzed and combined with the Markov model already created. In an embodiment, the combining of the multiple sequence of event can increase learned association between transitions and weaken noise or false positives. It is conceivable that this method could be applied within a system that had the absence of noise or false positives, in which case a pairwise Markov model could be utilized along with the log retrieval and model combination to achieve the same method.

Figure 5:
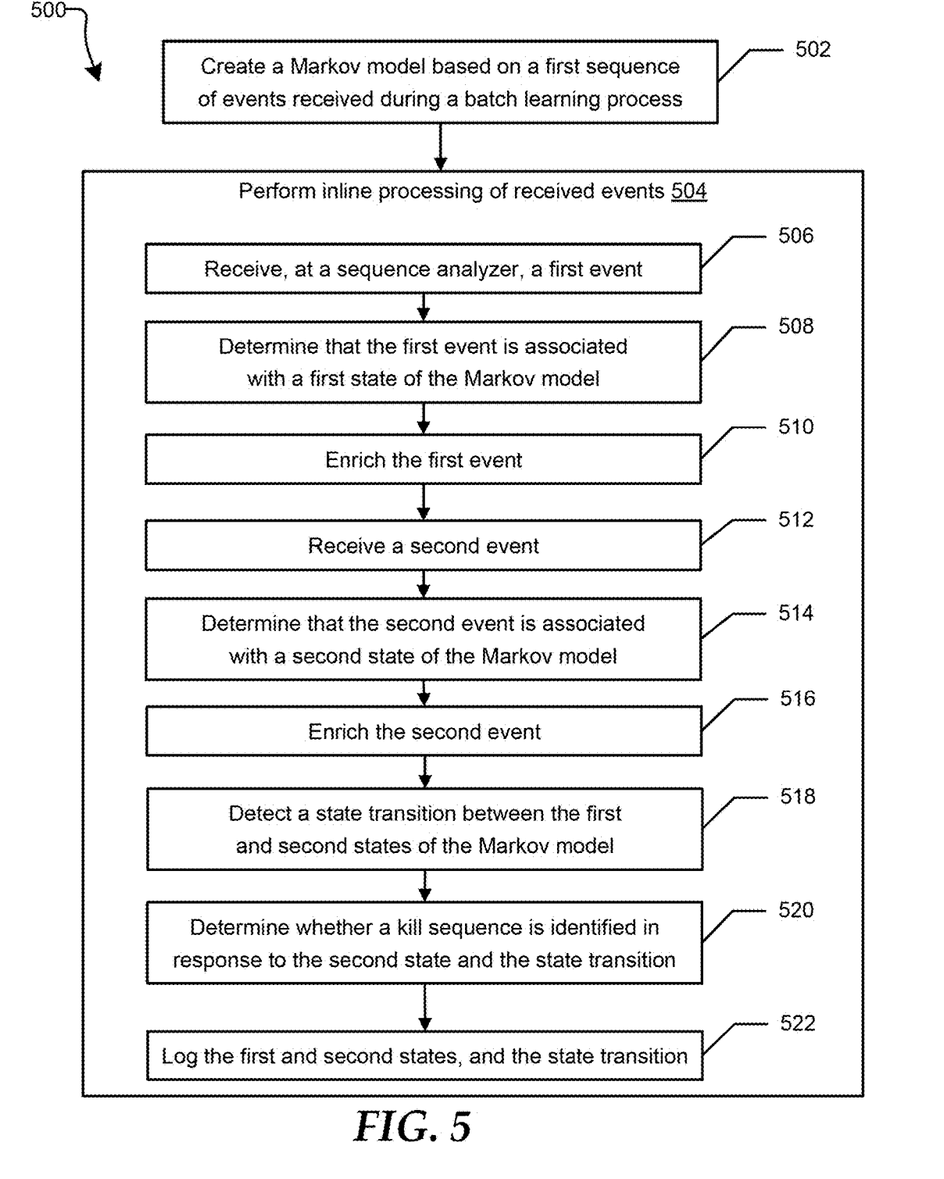
FIG. 5 is a flow diagram illustrating a method for performing an inline process to search for malicious event according to an embodiment of the disclosure.

FIG. 5 is a flowchart of a method 500 for performing an inline process to search for malicious event according to an embodiment of the disclosure. At block 502, a Markov model is created based on a first sequence of events received during a learning process of a sequence analyzer. An inline process is performed in the sequence analyzer at block 504. In an embodiment, the method can include the following steps during the inline process. At block 506, a first event is received at the sequence analyzer. A first state of the Markov model is determined to be associated with the first event at block 508.

The first event is enriched in response to the first state being associated with the first state of the Markov model at block 510. At block 512, a second event is received. A second state of the Markov model is determined to be associated with the second event at block 514. The second event is enriched in response to the second state being associated with the second state of the Markov model at block 516. At block 518, a state transition from the first state to the second state in the Markov model is detected. A determination is made whether a kill sequence can be identified in response to the second state and the state transition at block 520. At block 522, the first event, the second event, and the state transition are logged in response to the kill sequence being identified. In an embodiment, the kill sequence is positively identified in response to the first event being a reference event, and the second event being an event that occurs after the reference event in a sequence of events. In an embodiment, the reference event is a known malicious event of a kill sequence. In an embodiment, the kill sequence is partial identified in response to the first event being an event that occurs before a reference event in a sequence of events, and the second event being an event that occurs after the reference event.

Figure 6:
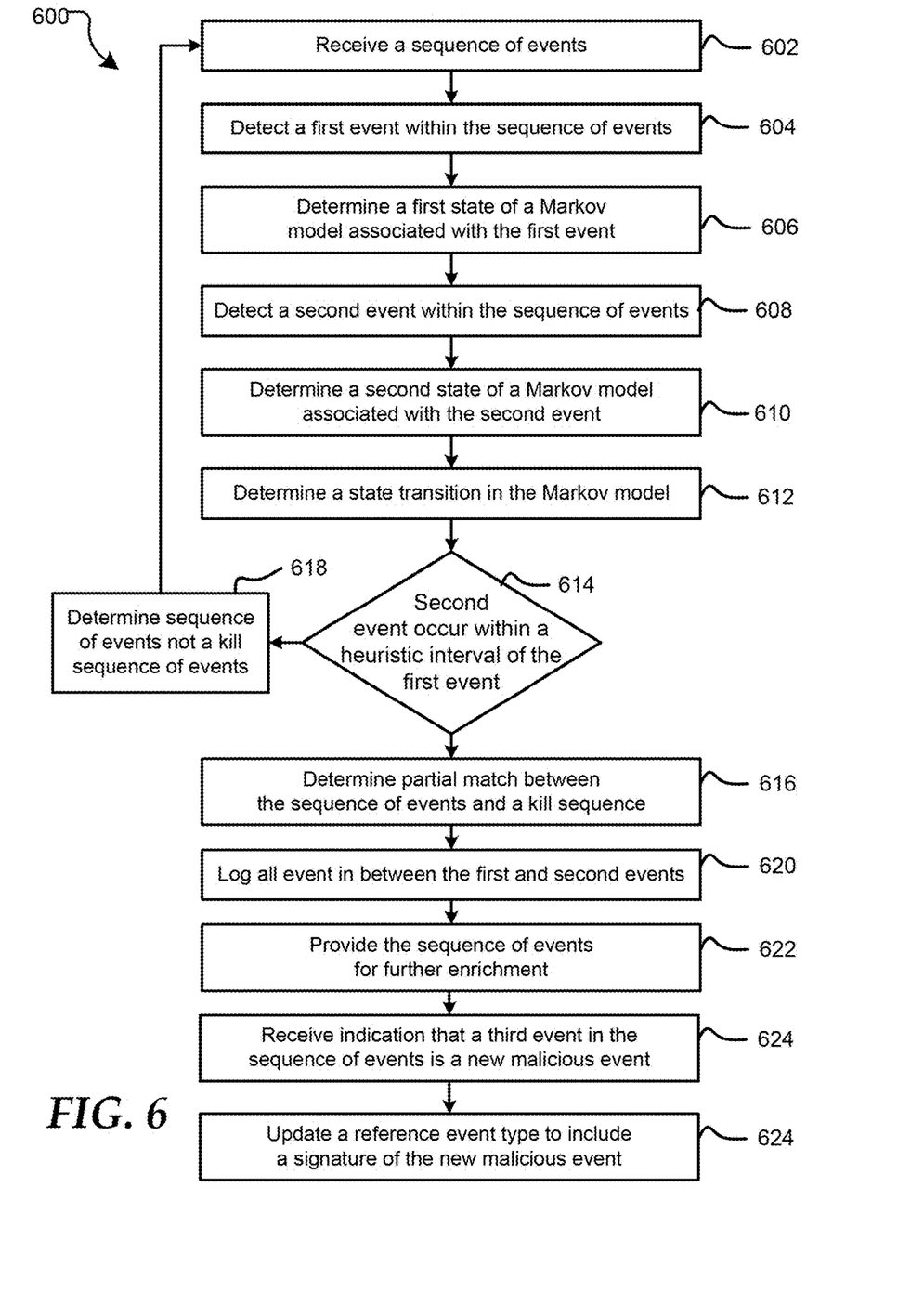
FIG. 6 is a flow diagram illustrating a method for determining a partial match of a sequence of events to a kill sequence of events according to an embodiment of the disclosure.

FIG. 6 is a flow diagram of a method 600 for determining a partial match of a sequence of events to a kill sequence of events according to an embodiment of the disclosure. At block 602, a sequence of events is received from an information handling system. In an embodiment, the sequence of events can be received at a sequence analyzer. A first event is detected within the sequence of events at block 604. At block 606, a first state of a Markov model associated with the first event is determined.

At block 608, a second event within the sequence of events is detected. A second state of the Markov model associated with the second event is determined at block 610. At block 612, a state transition from the first state to the second state in the Markov model is determined. At block 614, a determination is made whether the second event occurred within a heuristic interval of the first event. If so, the flow continues at block 616. Otherwise, the sequence of events is determined not to be a kill sequence of events at block 618, and the flow continues as stated above at block 602. At block 616, a partial match of the sequence of events to a kill sequence of events is determined in response to the state transition from the first state to the second state in the Markov model.

At block 620, all events that occurred in the information handling system in between the first event and the second event are logged. At block 622, the sequence of events is provided to a further enrichment stage. In an embodiment, the logged events that occurred between the first and second events are researched by a human analyst during the further enrichment stage. At block 624, an indication that a third event within the logged events is identified as a new malicious event is received. A reference event type is updated to include a signature of the new malicious event at block 626.

Figure 7:
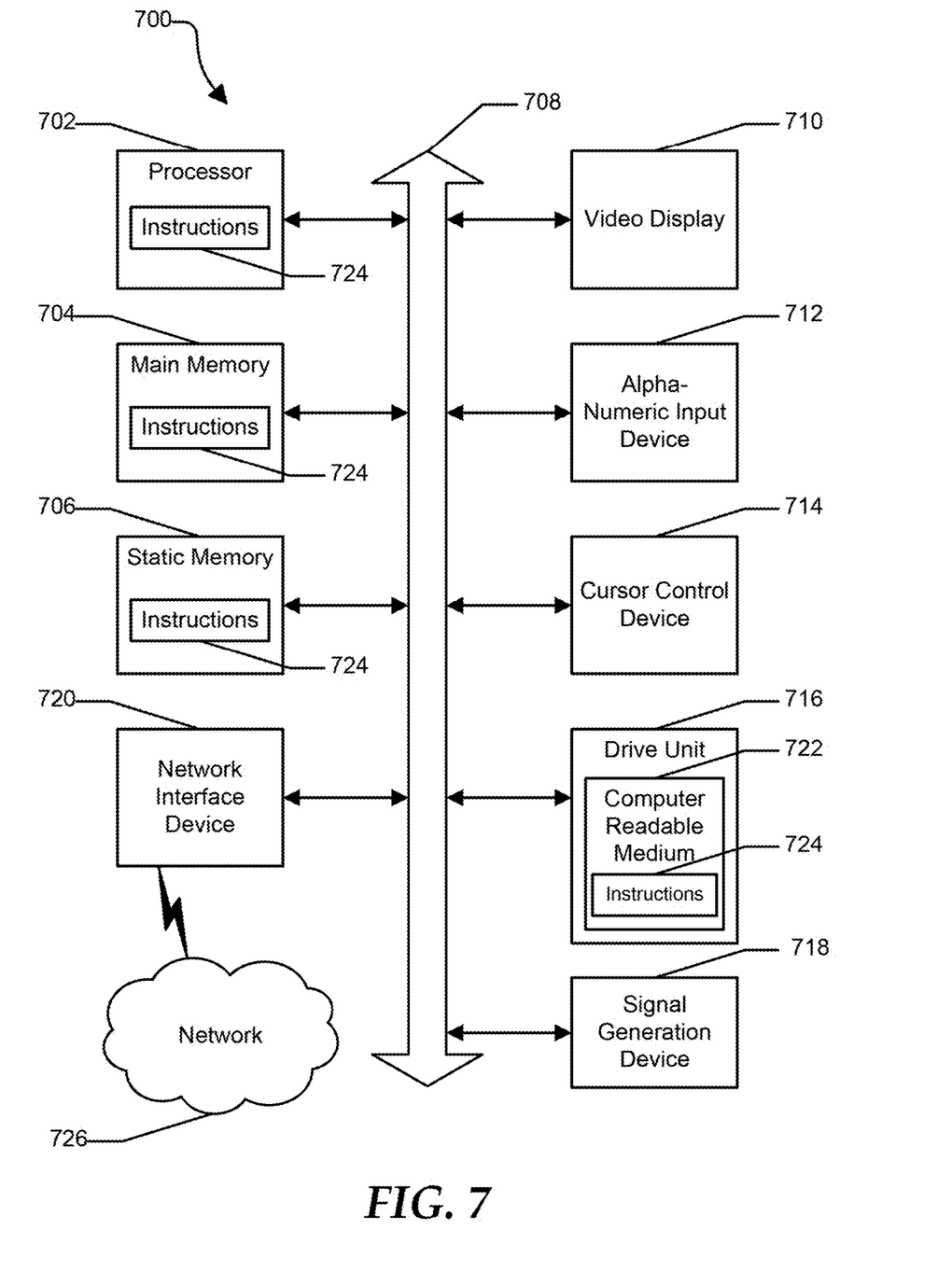
FIG. 7 is a block diagram illustrating an information handling system according to an embodiment of the present disclosure.

FIG. 7 shows an information handling system 700 capable of administering each of the specific embodiments of the present disclosure. The information handling system 700 can represent the user information handling systems 102, 108, 112, 126, 110, 128, and 140 of FIG. 1. The information handling system 700 may include a processor 702 such as a central processing unit (CPU), a graphics processing unit (GPU), or both. Moreover, the information handling system 700 can include a main memory 704 and a static memory 707 that can communicate with each other via a bus 708. The information handling system 700 includes near-field communications (NFC) device and interface 718, such as an antenna and NFC subsystem. The information handling system 700 can also include a disk drive unit 716, and a network interface device 720. As shown, the information handling system 700 may further include a video display unit 710, such as a liquid crystal display (LCD), an organic light emitting diode (OLED), a flat panel display, a solid state display, or a cathode ray tube (CRT). The video display unit 710 may also act as an input accepting touchscreen inputs. Additionally, the information handling system 700 may include an input device 712, such as a keyboard, or a cursor control device, such as a mouse or touch pad. Information handling system may include a battery system 714. The information handling system 700 can represent a device capable of telecommunications and whose can be share resources, voice communications, and data communications among multiple devices. The information handling system 700 can also represent a server device whose resources can be shared by multiple client devices, or it can represent an individual client device, such as a laptop or tablet personal computer.

The information handling system 700 can include a set of instructions that can be executed to cause the computer system to perform any one or more of the methods or computer based functions disclosed herein. The computer system 700 may operate as a standalone device or may be connected such as using a network, to other computer systems or peripheral devices.

In a networked deployment, the information handling system 700 may operate in the capacity of a server or as a client user computer in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or subsystems that individually or jointly execute a set, or multiple sets, of instructions to perform one or more computer functions.

The disk drive unit 716 or static memory 714 may include a computer-readable medium 722 in which one or more sets of instructions 724 such as software can be embedded. The disk drive unit 716 or static memory 714 also contains space for data storage. Further, the instructions 724 may embody one or more of the methods or logic as described herein. In a particular embodiment, the instructions 724 may reside completely, or at least partially, within the main memory 704, the static memory 706, and/or within the processor 702 during execution by the information handling system 700. The main memory 704 and the processor 702 also may include computer-readable media. The network interface device 720 can provide connectivity to a network 726, e.g., a wide area network (WAN), a local area network (LAN), wireless network (IEEE 702), or other network. The network interface 720 may also interface with macrocellular networks including wireless telecommunications networks such as those characterized as 2G, 3G, or 4G or similar wireless telecommunications networks similar to those described above. The network interface 720 may be a wireless adapter having antenna systems 732 for various wireless connectivity and radio frequency subsystems 730 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 728 can communicate voice, video or data over the network 728. Further, the instructions 724 may be transmitted or received over the network 728 via the network interface device 720. In a particular embodiment, BIOS/FW code 724 reside in memory 704, and include machine-executable code that is executed by processor 702 to perform various functions of information handling system 700.

Information handling system 700 includes one or more application programs 724, and Basic Input/Output System and Firmware (BIOS/FW) code 724. BIOS/FW code 724 functions to initialize information handling system 700 on power up, to launch an operating system, and to manage input and output interactions between the operating system and the other elements of information handling system 700.

In another embodiment (not illustrated), application programs and BIOS/FW code reside in another storage medium of information handling system 700. For example, application programs and BIOS/FW code can reside in drive 716, in a ROM (not illustrated) associated with information handling system 700, in an option-ROM (not illustrated) associated with various devices of information handling system 700, in storage system 707, in a storage system (not illustrated) associated with network channel 720, in another storage medium of information handling system 700, or a combination thereof. Application programs 724 and BIOS/FW code 724 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    receiving, at a sequence analyzer, a sequence of events from an information handling system;
    detecting a first event within the sequence of events;
    determining a first state of a Markov model associated with the first event;
    detecting a second event within the sequence of events;
    determining a second state of the Markov model associated with the second event;
    detecting a state transition from the first state to the second state in the Markov model;
    determining a partial match of the sequence of events to a kill sequence of events in response to the state transition from the first state to the second state in the Markov model;
    determining a probability of a traversal within the sequence of events to a missing event of the kill sequence of events;
    providing the sequence of events to a further enrichment stage in response to the probability of the traversal being a high probability;
    logging all events that occurred in the information handling system in between the first event and the second event;
    identifying the first sequence of events as a possible kill sequence in response to determining the partial match; and
    providing the sequence of events to the further enrichment stage, wherein the logged events that occurred between the first and second events are researched by a human analyst during the further enrichment stage.

2. The method of claim 1, further comprising:
    receiving an indication that a third event within the logged events is identified as a new malicious event; and
    updating a reference event type to include a signature of the new malicious event.

3. The method of claim 2, wherein the reference event type is a group of events previously identified as malicious events.

4. The method of claim 1, further comprising:
    determining that the second event occurred within a heuristic interval of the first event prior to determining the partial match.

5. The method of claim 1, wherein the reference event type is classified by an existing system.

6. The method of claim 1, wherein the sequence of events is received during an inline process.

7. An information handling system comprising:
    an input to receive events from another information handling system within a network; and
    a hardware processor to:
        receive a sequence of events;
        detect a first event within the sequence of events;
        determine a first state of a Markov model associated with the first event;
        detect a second event within the sequence of events;
        determine a second state of the Markov model associated with the second event;
        detect a state transition from the first state to the second state in the Markov model;
        determine a partial match of the sequence of events to a kill sequence of events in response to the state transition from the first state to the second state in the Markov model;
        determine a probability of a traversal within the sequence of events to a missing event of the kill sequence of events;
        provide the sequence of events to a further enrichment stage in response to the probability of the traversal being high;
        log all events that occurred in the information handling system in between the first event and the second event;
        identify the first sequence of events as a possible kill sequence in response to determining the partial match; and
        provide the sequence of events to the further enrichment stage, wherein the logged events that occurred between the first and second events are researched by a human analyst during the further enrichment stage.

8. The information handling system of claim 7, the hardware processor further to receive an indication that a third event within the logged events is identified as a new malicious event, and to update a reference event type to include a signature of the new malicious event.

9. The information handling system of claim 8, wherein the reference event type is a group of events previously identified as malicious events.

10. The information handling system of claim 7, the hardware processor further to determine that the second event occurred within a heuristic interval of the first event prior to determining the partial match.

11. The information handling system of claim 7, wherein the sequence of events is received during an inline process.

12. A method comprising:
creating, at a sequence analyzer, a Markov model based on a first sequence of events received during a learning process; and
performing an inline process, during the inline process:
   receiving, at a sequence analyzer, a first event;
   determining a first state of the Markov model associated with the first event;
   receiving a second event;
   determining a second state of the Markov model associated with the second event;
   detecting a state transition in from the first state to the second state in the Markov model;
   determining whether a kill sequence can be identified in response to the second state and the state transition;
   determining a probability of a traversal within the sequence of events to a missing event of the kill sequence of events;
   providing the sequence of events to a further enrichment stage in response to the probability of the traversal being a high probability;
   in response to the kill sequence being identified, logging the first event, the second event, and the state transition;
   logging the first and second events in response to the kill sequence being partially identified; and
   providing log information pertaining to an entity between a heuristic of a missing partial sequence a memory for review by a human analyst.

13. The method of claim 12, further comprising:
enriching the first event in response to the first state being associated with the first state of the Markov model.

14. The method of claim 13, wherein enriching the first event comprises:
determining information about the first event with respect to a kill sequence.

15. The method of claim 12, wherein the kill sequence is positively identified in response to the first event being a reference event, and the second event being an event that occurs after the reference event in a sequence of events.

16. The method of claim 12, wherein the reference event is a known malicious event of a kill sequence.

17. The method of claim 12, wherein the kill sequence is partial identified in response to the first event being an event that occurs before a reference event in a sequence of events, and the second event being an event that occurs after the reference event.

* * * * *